No. 808,457. PATENTED DEC. 26, 1905.
H. F. KRAVER.
PIPE COUPLING.
APPLICATION FILED MAY 11, 1905.

Witnesses
R. A. Boswell
George M. Anderson

Inventor
Harvey F. Kraver
By E. W. Anderson
his Attorney

UNITED STATES PATENT OFFICE.

HARVEY F. KRAVER, OF MEDINA, OHIO.

PIPE-COUPLING.

No. 808,457.  Specification of Letters Patent.  Patented Dec. 26, 1905.

Application filed May 11, 1905. Serial No. 259,887.

*To all whom it may concern:*

Be it known that I, HARVEY F. KRAVER, a citizen of the United States, and a resident of Medina, in the county of Medina and State of Ohio, have made a certain new and useful Invention in Pipe-Couplings; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
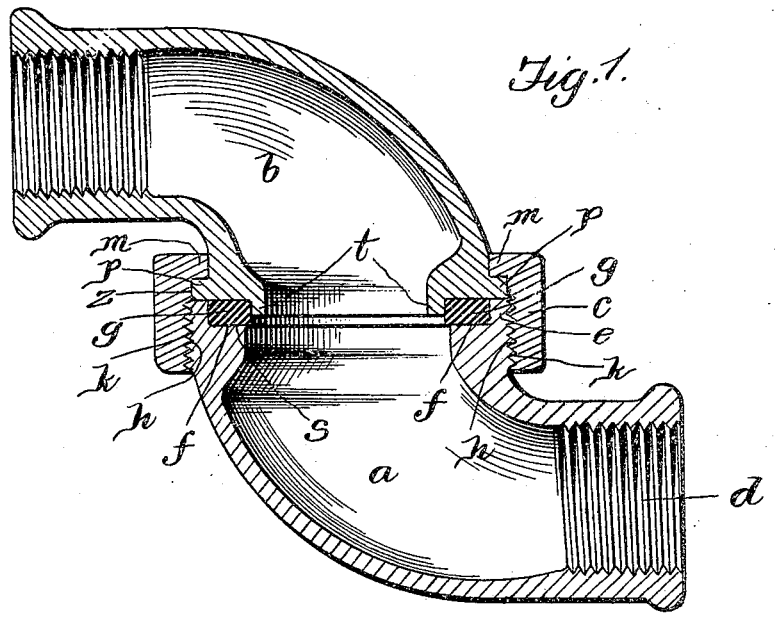
Figure 2:
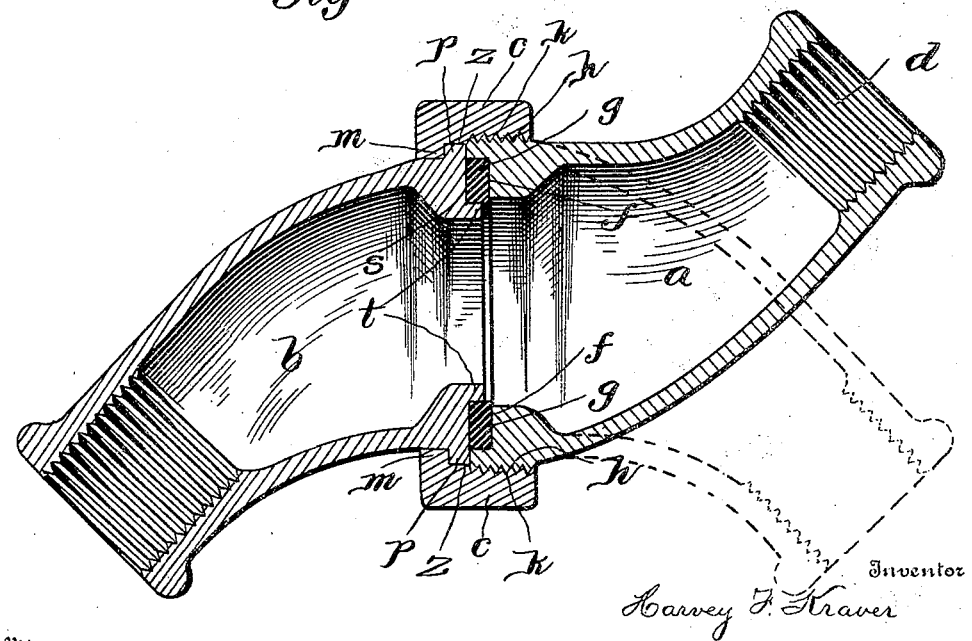

Figure 1 is a central section of a pipe-joint having my invention applied thereto. Fig. 2 is a similar view showing the meeting faces of the members in a plane at an angle of forty-five degrees to the faces of the outer ends of said members.

The invention relates to adjustable pipe-couplings; and it consists in the novel construction and combination of parts, as hereinafter set forth.

In the accompanying drawings the letter $a$ designates one member of the joint, $b$ the other member, and $c$ the coupling-ring.

The member or branch $a$ of the joint consists of a curved tapering tubular casting having at one end a thread $d$ for connection with a section of pipe. The other end of the member is expanded in circular form and provided with an exterior annular marginal flange $e$, thereby forming a bearing at $f$ for a gasket $g$. The exterior of this marginal portion is threaded at $h$ to connect with the interior thread $k$ of the coupling-ring, which is provided with an internal annular lip $m$ at the opposite end from the thread, as shown.

The member or branch $b$ of the joint consists of a curved tapering tubular casting which is similar to the member $a$ except that its circular expanded end is made without a thread and is provided with an exterior annular flange $p$ and with an interior annular flange $t$ at right angles to said exterior annular flange, the interval between the two flanges forming a bearing for the gasket.

When the parts are assembled, the end of the member $b$ is connected to the coupling-ring, so that its exterior flange $p$ engages the internal lip $m$ of said ring. The gasket being placed in position in the annular channel-bearing $s$, the other member is screwed into position in engagement with the coupling-ring, which is threaded for this purpose as far as the smooth bearing portion $z$ between the thread and the lip $m$. The interior lip or flange $t$ of the member $b$ of the joint protects the inner edge of the gasket or packing $g$, which is usually piled in several thicknesses.

Usually the axis of the opening in the expanded end of each member is at right angles with the axis of the other meeting end, which is threaded for engagement with a pipe-section, and by various adjustments of the parts the joint may be adapted to carry forward or to serve as a return-joint or to operate at different angles. Each coupling member is longitudinally curved or arc-shaped and tapering from its expanded base or meeting face to its outer end, and the plane of the meeting face is at right angles to the axis of the tube at its enlarged or base end.

In Fig. 2 of the drawings the meeting faces of the coupling members are shown as in a plane at an angle of forty-five degrees with the faces of the outer ends of said members. In this way the least possible resistance is offered to the passage of the contents of the pipe. The members are abutted squarely in a plane at right angles to the axis of their bases, and the joint members can be often more easily connected, especially where the ends do not fully meet. Disconnection is also facilitated, and the wrench can be used to better advantage in some cramped places.

Having described this invention, what I claim, and desire to secure by Letters Patent, is—

1. In an adjustable pipe-coupling, the combination with a longitudinally-curved tapering tubular member having an internally-expanded seat end provided with an exterior threaded annular flange, and a longitudinally-curved tapering tubular member having an internally-expanded seat end provided with an outward-directed exterior annular flange and an interior annular flange at right angles thereto and parallel to the exterior annular flange of the first-named member, of a coupling-ring having an internal thread engaging the thread of the exterior annular flange of the first-named member and having an inward-directed annular flange engaging the outward-directed flange of the last-named member, substantially as specified.

2. An adjustable pipe-coupling, having in combination an internally flanged and threaded coupling-ring, a tubular member having a longitudinal curvature through an arc of forty-five degrees and an expanded seat end engaging said coupling-ring, a gasket, and a tubular member having a longitudinal curvature through an arc of forty-five degrees and an expanded seat end provided with an exterior annular flange to engage the flange of the coupling-ring, and an interior annular flange at right angles to said exterior annular-flange covering in the gasket, the meeting faces of said members being in a plane at right angles to the axis of their meeting ends and at an angle of forty-five degrees to the faces of the outer ends of said members, substantially as specified.

In testimony whereof I affix my signature in presence of two witnesses.

HARVEY F. KRAVER.

Witnesses:
H. F. GABLE,
F. O. PHILLIPS.